United States Patent
Shi et al.

(10) Patent No.: US 8,706,117 B2
(45) Date of Patent: Apr. 22, 2014

(54) METHODS AND SYSTEMS FOR PROACTIVELY REQUESTING NEIGHBOR BASE STATION INFORMATION

(75) Inventors: Guangming Carl Shi, San Diego, CA (US); Kuo-Chun Lee, San Diego, CA (US); Steven D. Cheng, San Diego, CA (US); Shan Qing, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 584 days.

(21) Appl. No.: 12/260,247

(22) Filed: Oct. 29, 2008

(65) Prior Publication Data

US 2010/0105388 A1 Apr. 29, 2010

(51) Int. Cl.
 *H04W 36/00* (2009.01)
(52) U.S. Cl.
 USPC ............ 455/436; 455/438; 455/439; 455/331
(58) Field of Classification Search
 USPC ........................ 455/436, 438, 439; 370/331
 See application file for complete search history.

(56) References Cited

U.S. PATENT DOCUMENTS

| | | | |
|---|---|---|---|
| 5,987,332 A | | 11/1999 | Gettleman et al. |
| 6,161,015 A | * | 12/2000 | Birchler et al. ................ 455/440 |
| 6,643,512 B1 | * | 11/2003 | Ramaswamy ............. 455/435.1 |
| 7,570,963 B2 | | 8/2009 | Wang et al. |
| 7,889,713 B2 | * | 2/2011 | Zheng et al. .................. 370/351 |
| 2005/0048974 A1 | | 3/2005 | Kim et al. |
| 2005/0101326 A1 | * | 5/2005 | Kang et al. ..................... 455/436 |
| 2007/0105586 A1 | * | 5/2007 | Kim et al. ....................... 455/525 |
| 2007/0275726 A1 | * | 11/2007 | Lee et al. ....................... 455/436 |
| 2007/0280135 A1 | | 12/2007 | Syed et al. |
| 2008/0146232 A1 | | 6/2008 | Knisely |

FOREIGN PATENT DOCUMENTS

GB 2378092 A 1/2003

OTHER PUBLICATIONS

Anonymous Ed—Anonymous: "Draft IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands, IEEE P802.16e/D5" IEEE Standard; [IEEE Standard], IEEE, Piscataway, NJ, USA, Sep. 18, 2004, pp. 1,62-67, XP002541507 ISBN: 978-0-7381-4856-4 p. 62, paragraph 6.3.2.3.47—p. 67, paragraph 6.3.2.3.48 p. 127, paragraph 6.3.20.1.1.
International Search Report and Written Opinion—PCT/US2009/060667, International Search Authority—European Patent Office—Mar. 1, 2010
Search Authority—European Patent Office—Mar. 1, 2010.
Taiwan Search Report—TW098136360—TIPO—Sep. 21, 2012.

* cited by examiner

*Primary Examiner* — Danh Le
(74) *Attorney, Agent, or Firm* — Tyler J. Overall

(57) ABSTRACT

Certain embodiments of the present disclosure allow a mobile station (MS) to proactively request neighbor base station information from a serving base station, for example, if a mobile neighbor advertisement (MOB_NBR-ADV) message is not received (or expected) in a predetermined time period.

28 Claims, 11 Drawing Sheets

METHODS AND SYSTEMS FOR PROACTIVELY REQUESTING NEIGHBOR BASE STATION INFORMATION

TECHNICAL FIELD

The present disclosure generally relates to communication, and more specifically to methods and systems applied at a mobile station for requesting information about neighbor base stations that are available for a handover.

SUMMARY

Certain embodiments of the present disclosure provide a method for requesting information about available neighbor base stations for a handover in a wireless communications system. The method generally includes monitoring for a mobile neighbor advertisement message from a serving base station (BS) containing information about neighbor BSs available for handover and sending a mobile neighbor request message to the serving BS requesting information about neighbor BSs available for handover if a neighbor advertisement message is not received within a predetermined time period.

Certain embodiments provide a method for providing information about available neighbor base stations (BSs) for a handover in a wireless communications system. The method generally includes receiving, from a mobile station (MS), a mobile neighbor request message requesting information about neighbor BSs available for handover if a neighbor advertisement message is not received within a predetermined time period and, in response to the mobile neighbor request message, sending the mobile station (MS) a mobile neighbor response message with information about neighbor BSs available for the handover.

Certain embodiments of the present disclosure provide an apparatus for requesting information about available neighbor base stations for a handover in a wireless communications system. The apparatus generally includes logic for monitoring for a mobile neighbor advertisement message from a serving base station (BS) containing information about neighbor BSs available for handover and logic for sending a mobile neighbor request message to the serving BS requesting information about neighbor BSs available for handover if a neighbor advertisement message is not received within a predetermined time period.

Certain embodiments provide an apparatus for providing information about available neighbor base stations (BSs) for a handover in a wireless communications system. The apparatus generally includes logic for receiving, from a mobile station (MS), a mobile neighbor request message requesting information about neighbor BSs available for handover if a neighbor advertisement message is not received within a predetermined time period and, in response to the mobile neighbor request message, logic for sending the mobile station (MS) a mobile neighbor response message with information about neighbor BSs available for the handover.

Certain embodiments of the present disclosure provide an apparatus for requesting information about available neighbor base stations for a handover in a wireless communications system. The apparatus generally includes means for monitoring for a mobile neighbor advertisement message from a serving base station (BS) containing information about neighbor BSs available for handover and means for sending a mobile neighbor request message to the serving BS requesting information about neighbor BSs available for handover if a neighbor advertisement message is not received within a predetermined time period.

Certain embodiments provide an apparatus for providing information about available neighbor base stations (BSs) for a handover in a wireless communications system. The apparatus generally includes means for receiving, from a mobile station (MS), a mobile neighbor request message requesting information about neighbor BSs available for handover if a neighbor advertisement message is not received within a predetermined time period and, in response to the mobile neighbor request message, means for sending the mobile station (MS) a mobile neighbor response message with information about neighbor BSs available for the handover.

Certain embodiments of the present disclosure provide a computer-program product for requesting information about available neighbor base stations for a handover in a wireless communications system, comprising a computer readable medium having instructions stored thereon, the instructions being executable by one or more processors. The instructions generally include instructions for monitoring for a mobile neighbor advertisement message from a serving base station (BS) containing information about neighbor BSs available for handover and instructions for sending a mobile neighbor request message to the serving BS requesting information about neighbor BSs available for handover if a neighbor advertisement message is not received within a predetermined time period.

Certain embodiments provide a computer-program product for providing information about available neighbor base stations (BSs) for a handover in a wireless communications system, comprising a computer readable medium having instructions stored thereon, the instructions being executable by one or more processors. The instructions generally include instructions for receiving, from a mobile station (MS), a mobile neighbor request message requesting information about neighbor BSs available for handover if a neighbor advertisement message is not received within a predetermined time period and, in response to the mobile neighbor request message, instructions for sending the mobile station (MS) a mobile neighbor response message with information about neighbor BSs available for the handover.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A serving base station (BS) may periodically send a MOB_NBR-ADV (mobile neighbor advertising) message to a mobile station (MS). The MOB_NBR-ADV message may contain the neighbor BS information including the number of neighbor BSs and detailed information about every BS. The MS may use this particular information to determine the candidate BSs for a handover process.

Figure 4:
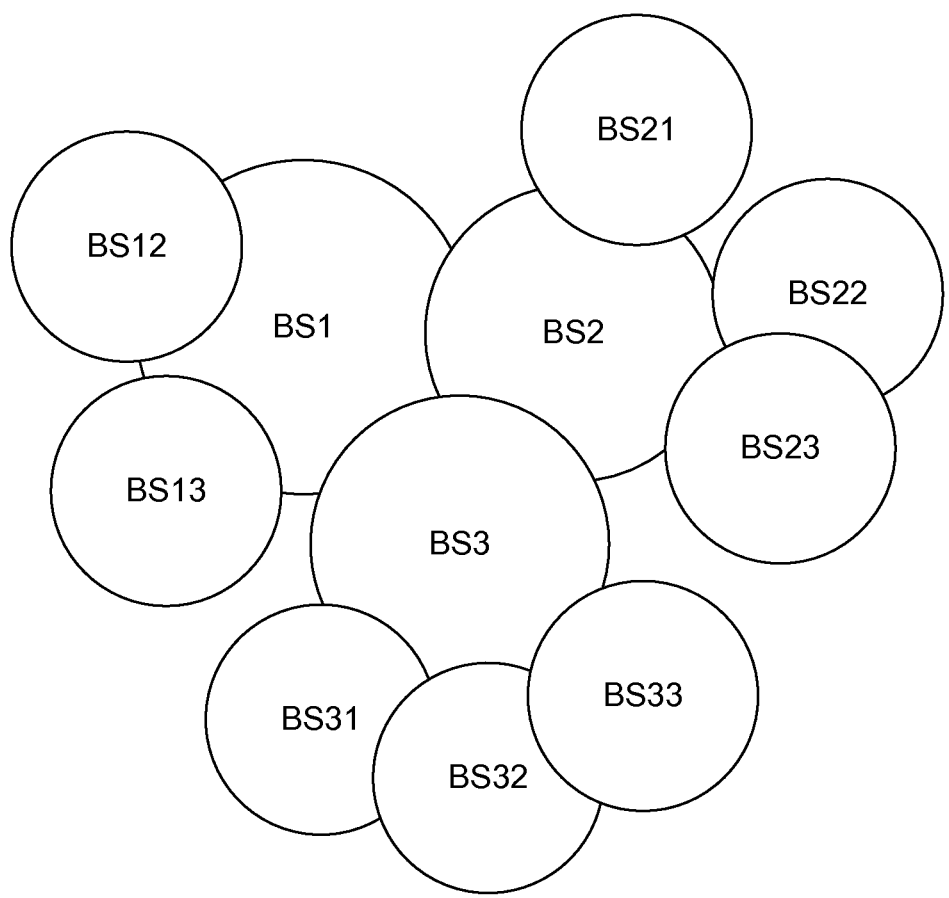
FIG. 4 illustrates an example of a base station (BS) topology in accordance with certain embodiments of the present disclosure.

As an illustrative example, three BSs may be considered: BS1, BS2 and BS3, and their corresponding neighbor BSs, as shown in FIG. 4. It may be also assumed that the MS's serving BS is a BS1, and that the MS may move from a location where the BS1 is the serving BS to a location where a BS3 is the serving BS through a location where a BS2 is the serving BS.

Several problems may occur during the handover process. At a boundary of the BS1 and the BS2, the MS may register with the BS1 without receiving the MOB_NBR-ADV message from the BS1, and may immediately move towards the coverage of the BS2. The MS may need to perform a handover to the BS2, but the MS may not have any available information about neighbor BSs, and hence does not have a candidate BS for the handover. This would result in a call drop at the MS side.

In another example, the MS may hand over from the BS1 to the BS2 and may move toward location covered by the BS3, but the MS has not received the MOB_NBR-ADV message from the BS2. Information about current candidate BSs available for the handover process may be sent by the BS1 and may be received by the MS. However, all candidate BSs may have already been out of the coverage of the MS since the MS may move away from the BS1. The MS may need to perform the handover to the BS3 or to another BS nearby, but the MS may not be able to find any available neighbor BS. This would result in a call drop at the MS side.

A potential solution for previous two problem scenarios may be to broadcast the MOB_NBR-ADV message more frequently in order to secure that the MS always receive the MOB_NBR-ADV message before performing the handover from one BS to another. However, the wireless network may need to utilize significant bandwidth resources since the MOB_NBR-ADV message may contain a large amount of data. In addition, a more frequent sending of MOB_NBR-ADV messages may not be required for most of the coverage area except for boundary areas between neighbor base stations. Consequently, this particular solution would result in a waste of bandwidth, hence resulting in a less efficient wireless network.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
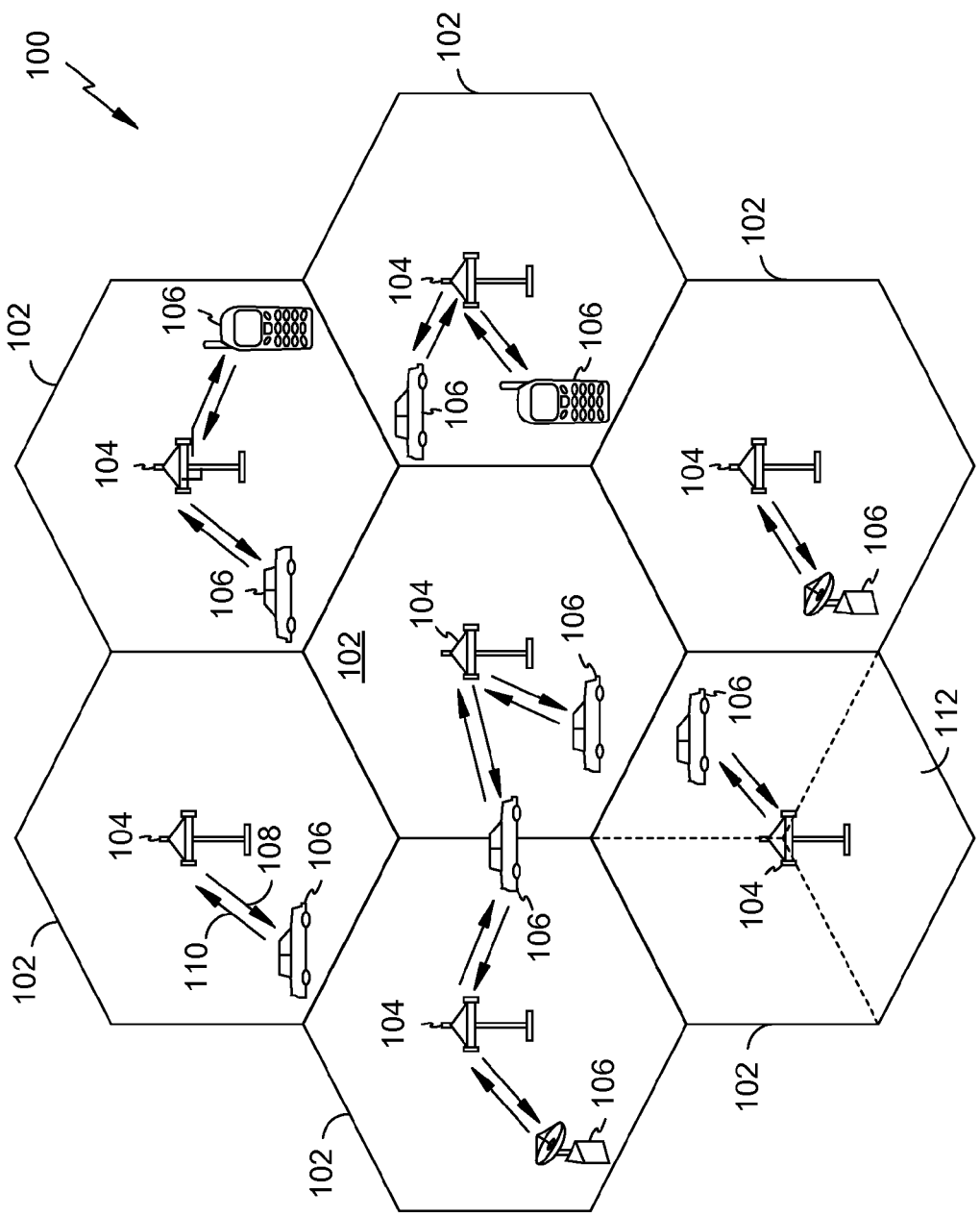
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
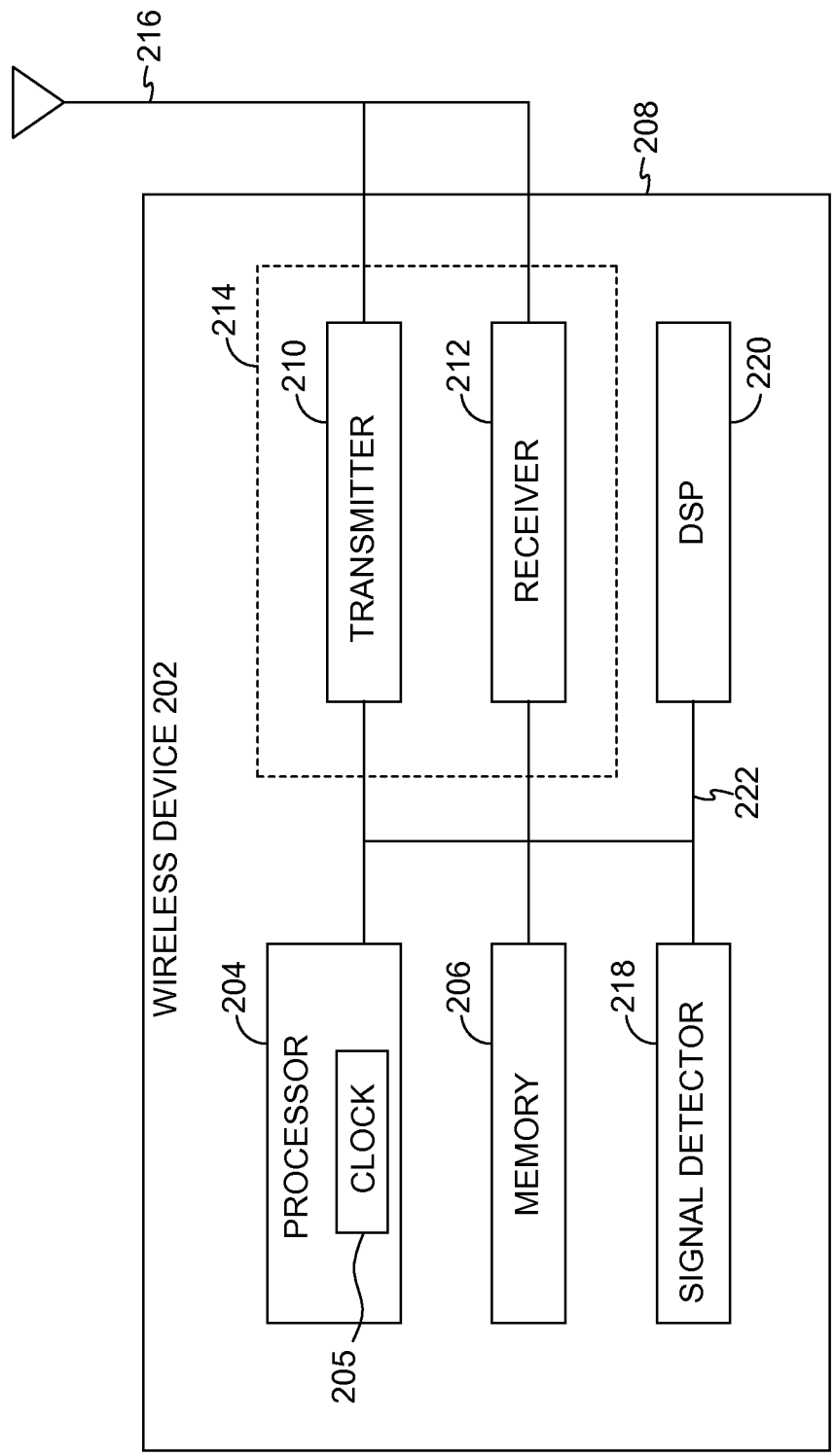
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
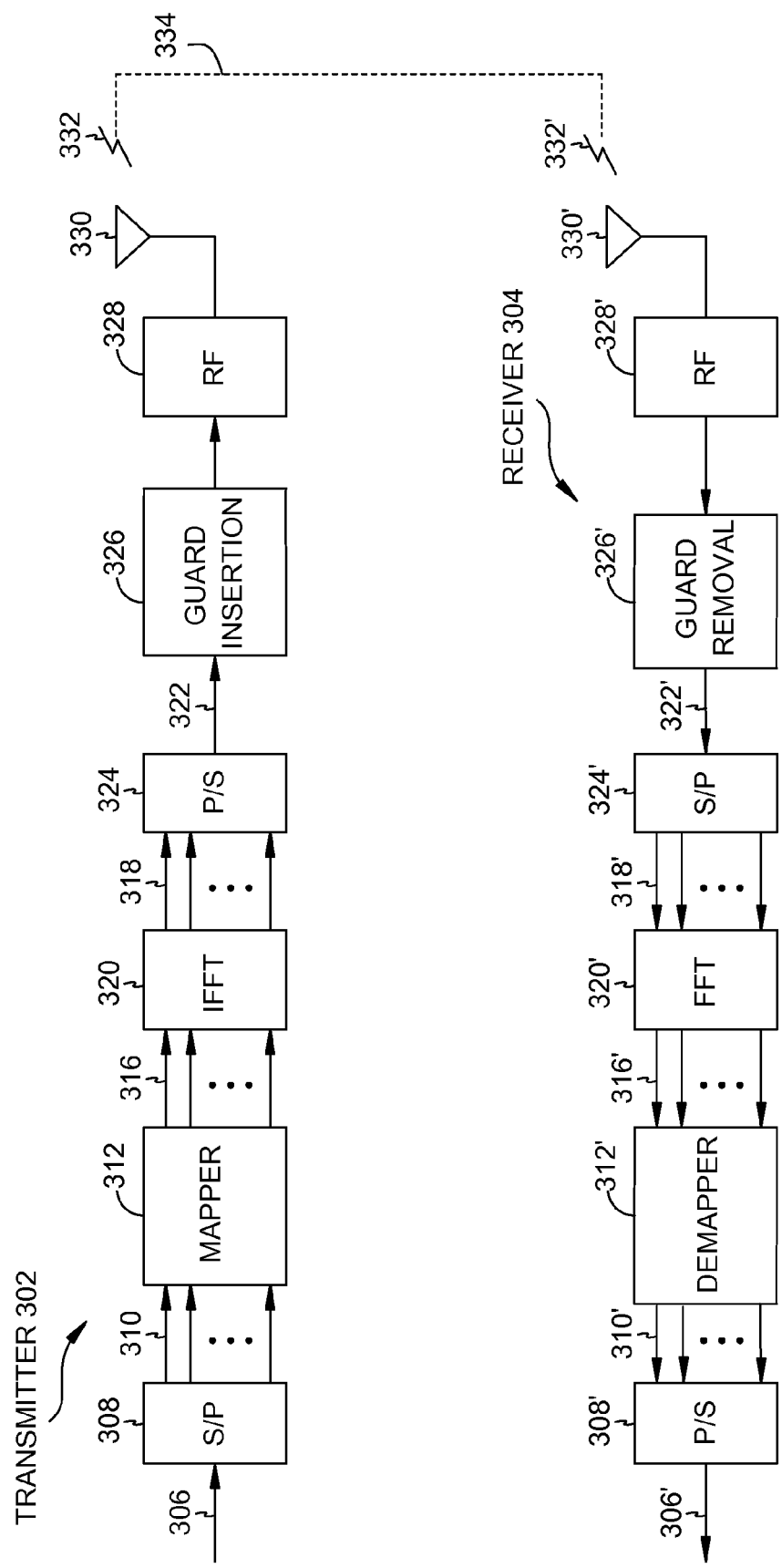
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, NS, is equal to NCP (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary Proactive Request for Information about Neighbor Base Stations for Handover FIG. 4 illustrates an example of a topology where serving base stations are surrounded with several neighbor base stations available for a handover process. The handover may occur when a mobile station (MS) is moving from a coverage area of the serving base station to a coverage area of another neighbor base station. The serving base station (BS) may periodically send a MOB_NBR-ADV (mobile neighbor advertising) message to mobile stations. The MOB_NBR-ADV message may contain information about neighbor BSs including the number of neighbor BSs and detailed information about every BS. The MS may use this information to determine candidate BS for a handover process.

However, several problems may occur during the handover that may prevent the currently served BS to provide required information to the MS about available neighbor BSs. Because of that, the MS may not be able to find any available neighbor BS for the handover and the call may be dropped. Methods proposed in the present disclosure may reduce the call drops during the handover, while the available channel bandwidth is efficiently utilized.

Figure 5:
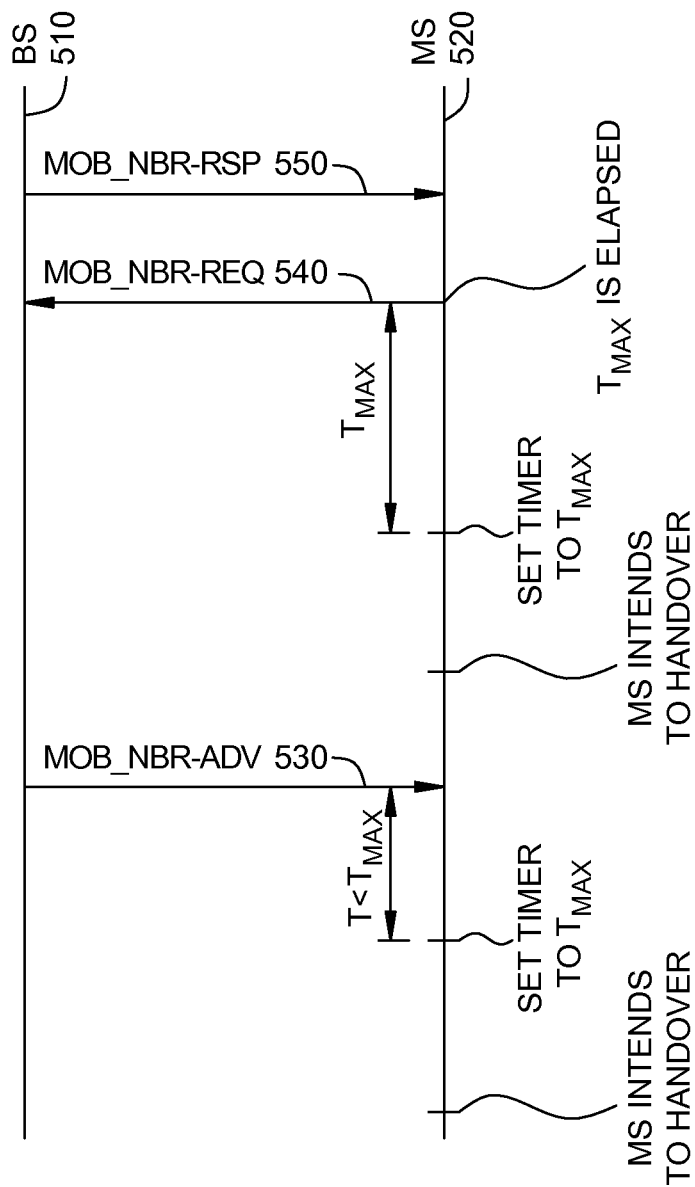
FIG. 5 illustrates a method of exchanging control messages for requesting the neighbor BS information to avoid call drops during a handover in accordance with certain embodiments of the present disclosure.
Figure 6:
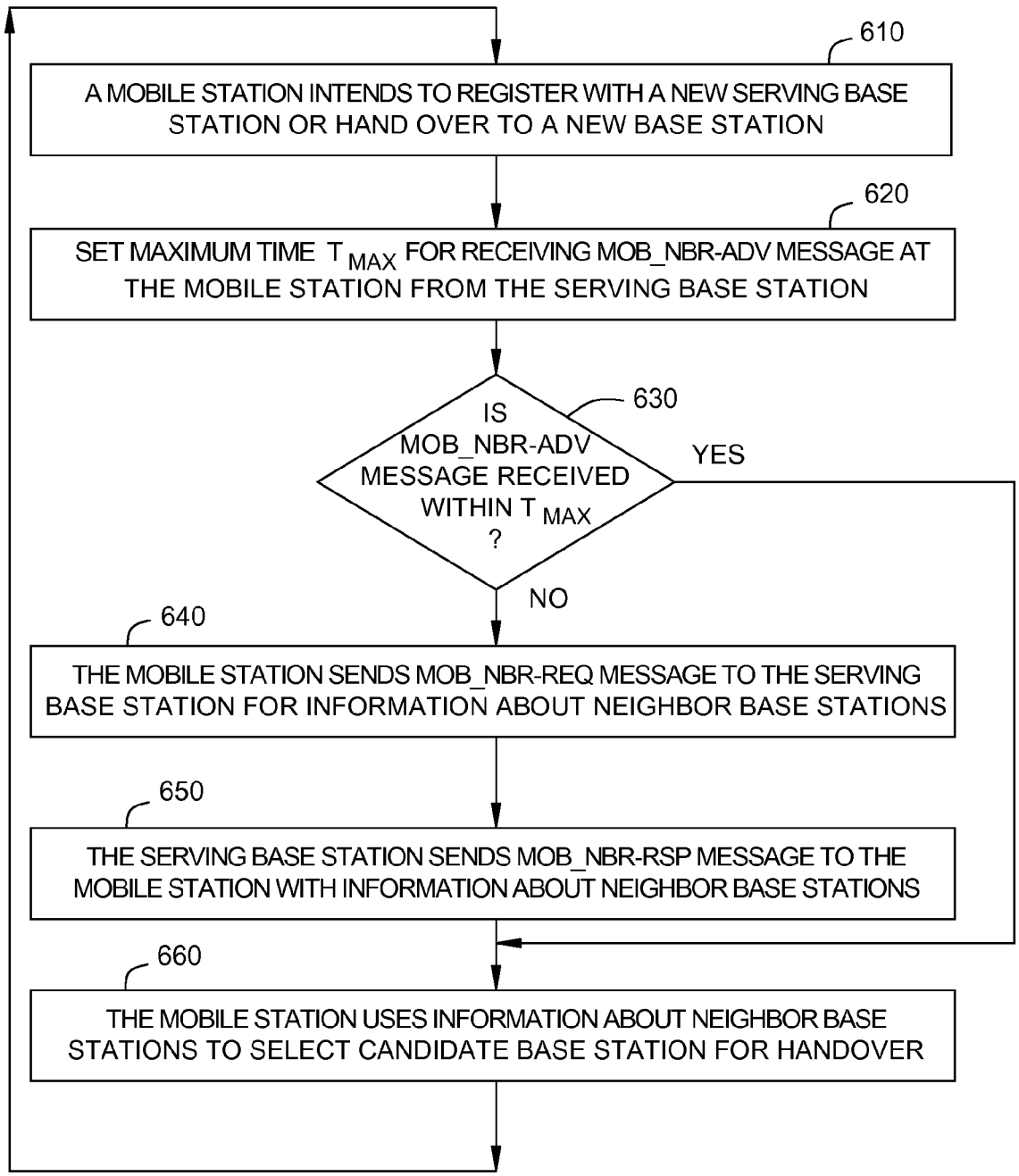
FIG. 6 shows an example flow diagram of the method illustrated in FIG. 5 in accordance with certain embodiments of the present disclosure.

FIG. 5 illustrates a proposed method of exchanging control messages for requesting the neighbor BS information to avoid call drops during a handover. FIG. 6 shows an example flow diagram of the method illustrated in FIG. 5. At 610, the MS may intend to register with a new BS or may intend to hand over to a new serving BS. Following that, as illustrated in FIG. 5, the maximum available time TMAX may be set at the MS 520 to wait on a reception of a MOB_NBR-ADV message from the serving BS 510, at 620. If the MOB_NBR-ADV message 530 is received within the time interval TMAX (decision step 630 in FIG. 6), then the MS 520 may use information about neighbor BSs from the received MOB_NBR-ADV message 530 to select candidate BS for the handover process, at 660.

On the other hand, if the MOB_NBR-ADV message is not received within the predefined time interval TMAX (decision step 630 in FIG. 6), as illustrated in FIG. 5, the MS 520 may send a MOB_NBR-REQ (mobile neighbor request) message 540 to the serving BS 510 in order to obtain information about neighbor BSs available for the handover (step 640 in FIG. 6). At 650, in response to the MOB_NBR-REQ message, the serving BS 510 may send a MOB_NBR-RSP (mobile neighbor response) message 550 to the MS 520 with information about neighbor BSs. Since the MOB_NBR-RSP message 550 may be a point-to-point message, the currently serving BS 510 may also indicate the preferred target BS within the MOB_NBR-RSP message. At 660, the MS 520 may use information about neighbor BSs from the received MOB_NBR-RSP message 550 to select a candidate BS for the handover.

Figure 7:
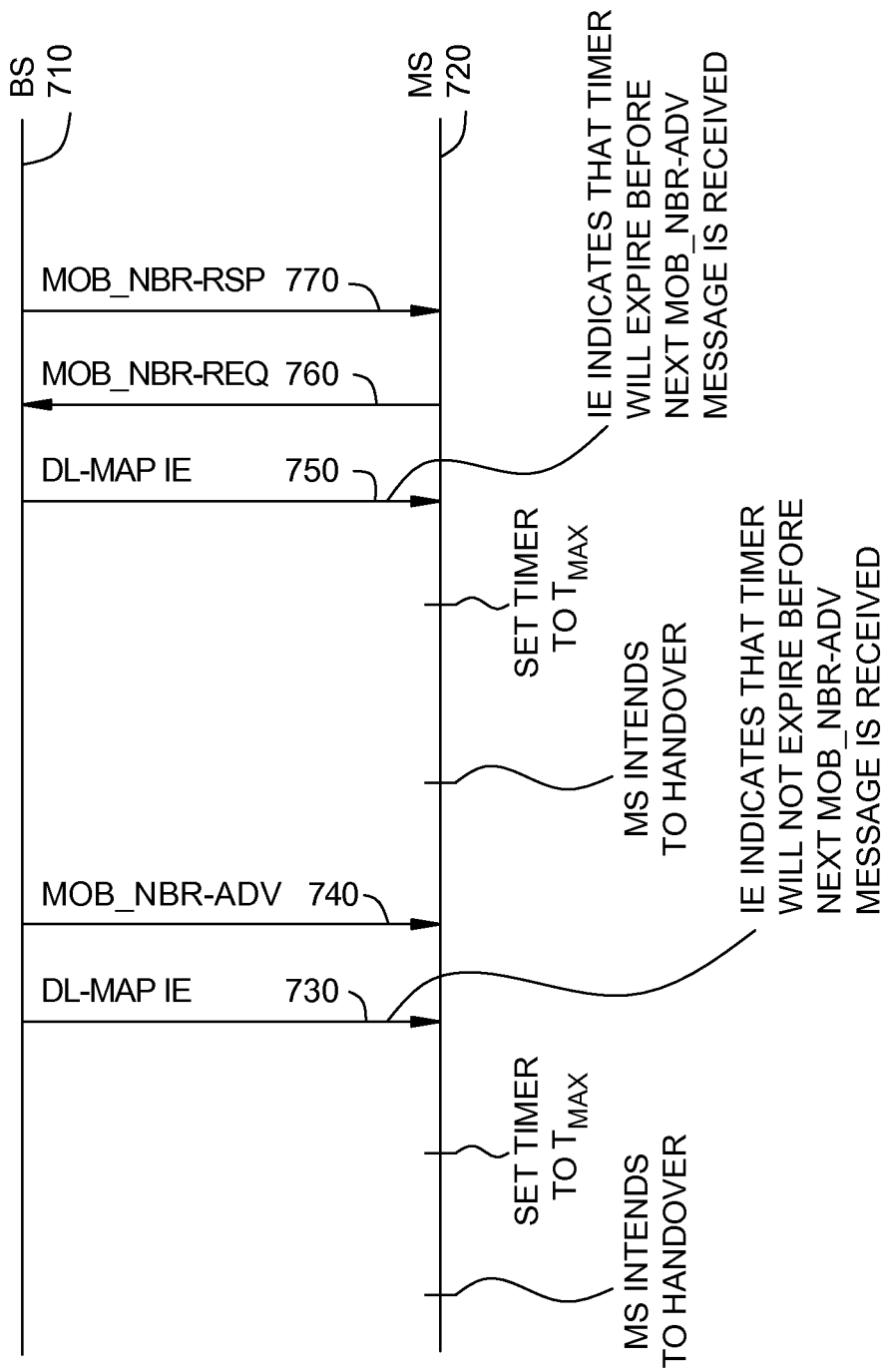
FIG. 7 illustrates another method of exchanging control messages for requesting the neighbor BS information to avoid call drops during a handover in accordance with certain embodiments of the present disclosure.
Figure 8:
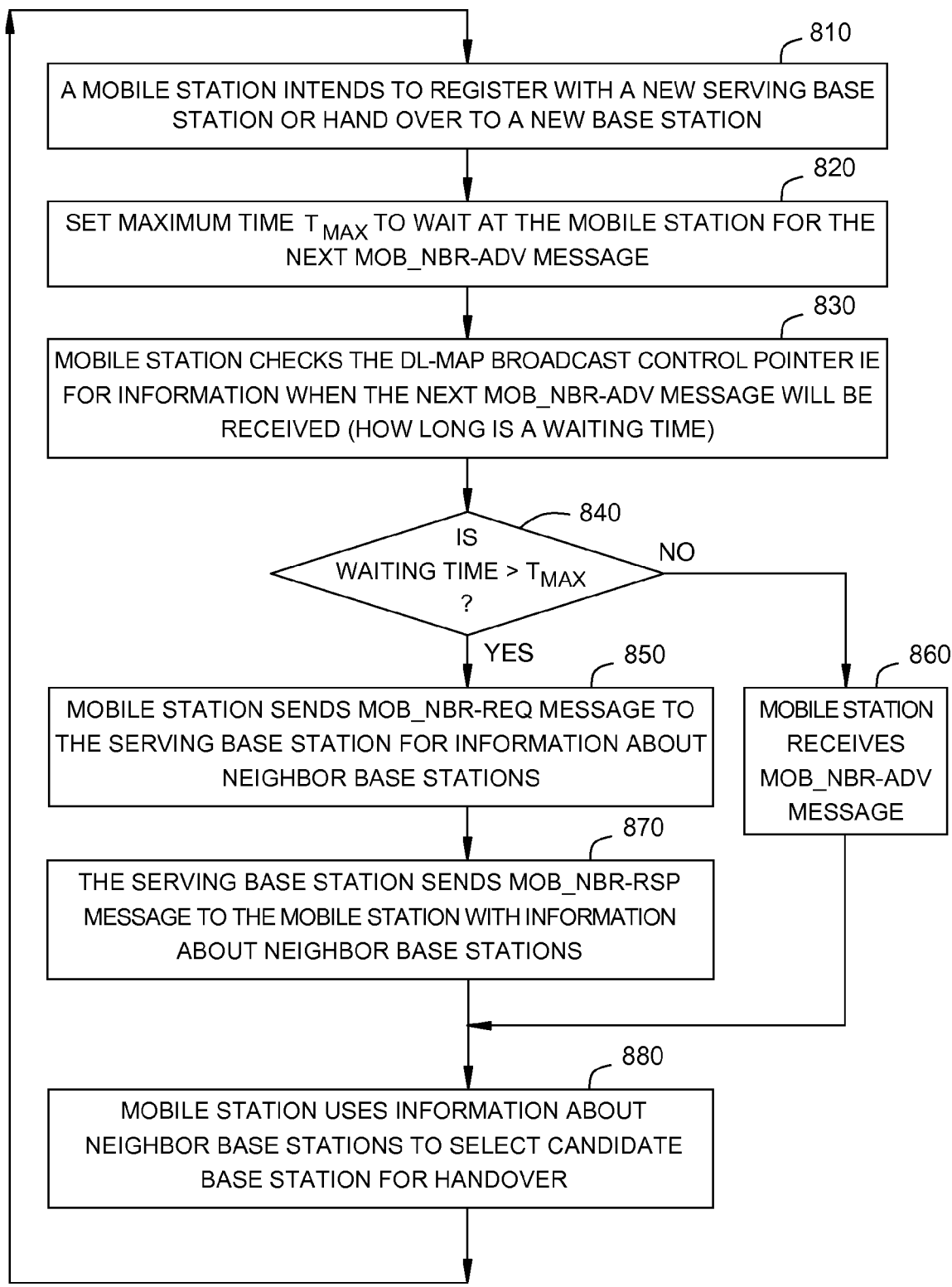
FIG. 8 shows an example flow diagram of the method illustrated in FIG. 7 in accordance with certain embodiments of the present disclosure.

FIG. 7 illustrates a proposed method of exchanging control messages for requesting the neighbor BS information to avoid call drops during a handover, with a serving BS indicating when a MOB_NBR ADV message may be expected. In the illustrated example, the serving BS may provide this information, in an information element (IE) of the DL-MAP. The information may be in the form of a number of frames in which to expect a message MOB_NBR ADV (e.g., N frames later), or an "absolute" frame number, from which the MS may calculate the duration (from the current frame number). FIG. 8 shows an example flow diagram of the method illustrated in FIG. 7.

At 810, the MS may intend to register with a new BS or may intend to hand over to a new serving BS. Following that, as illustrated in FIG. 7, a maximum available time TMAX to wait on a reception of information about the MOB_NBR-ADV message may be set at the MS 720 (step 820 in FIG. 8). At 830, the MS 720 may check the content of the DL-MAP Broadcast Control Pointer Information Element (IE) to obtain information regarding when the next MOB_NBR-ADV message will be received.

As illustrated in FIG. 7, if the DL-MAP IE 730 indicates that the time interval TMAX will not expire before receiving the next MOB_NBR-ADV message (decision step 840 in FIG. 8), the MS 720 may continue to wait and may receive the MOB_NBR-ADV message 740 from the serving BS 710 within the time interval TMAX, at 860. At 880, the MS 720 may use information about neighbor BSs from the received MOB_NBR-ADV message 740 to choose candidate BS for the handover process.

On the other hand, as illustrated in FIG. 7, if the DL-MAP IE 750 indicates that the time interval TMAX will expire before receiving the next MOB_NBR-ADV message (decision step 840 in FIG. 8), then the MS 720 may send a MOB_NBR-REQ message 760 to the serving BS 710 to request information about neighbor BSs available for the handover (step 850 in FIG. 8), without waiting for the time interval TMAX to expire. In response, at 870, the BS 710 may send a MOB_NBR-RSP message 770 to the MS 720 with information about neighbor BSs, including a preferred BS for the handover. At 880, the MS 720 may use information about neighbor BSs from the received MOB_NBR-RSP message 770 to select candidate BS for the handover process.

Figure 9:
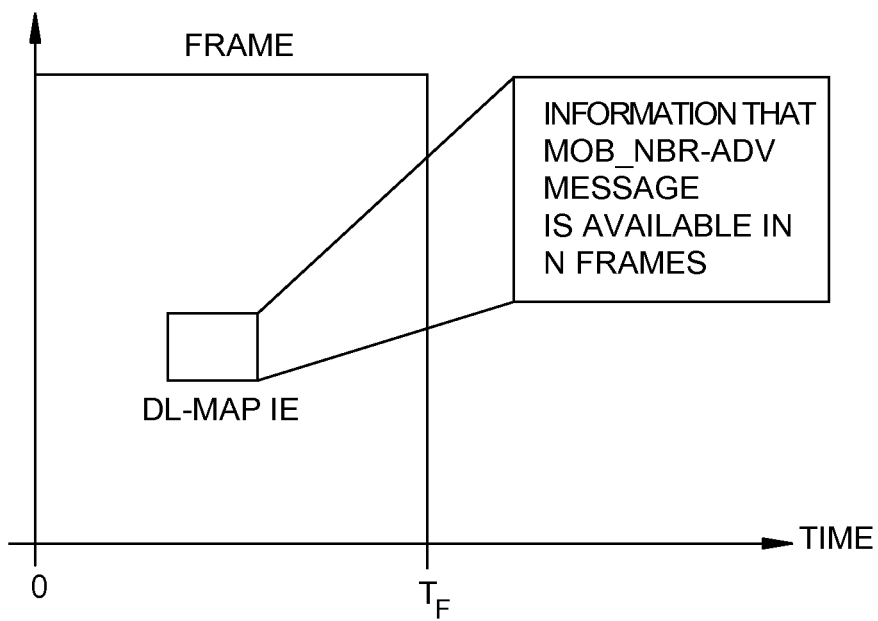
FIG. 9 illustrates an example content of a DL-MAP Information Element (IE) as a part of a transmitted frame in accordance with certain embodiments of the present disclosure.

FIG. 9 illustrates an example content of a DL-MAP Broadcast Control Pointer Information Element (IE) as a part of a transmitted downlink frame. The DL-MAP Broadcast Control Pointer IE may contain information regarding when the next MOB_NBR-ADV message will be received at the MS (e.g., in N downlink frames later), where duration of one frame may be equal to TF. By knowing how many frames later the MOB_NBR-ADV message will be received at the MS and by knowing duration of one downlink frame, it may be possible to determine from the DL-MAP Broadcast Control Pointer IE how long it is required to wait on the reception of the MOB_NBR-ADV message. For certain embodiments, the actual frame number that will contain the MOB_NBR-ADV message may be contained and the MS may calculate the wait time based on that frame number and the current frame number.

Methods proposed in the present disclosure may reduce call drops, while the available bandwidth is efficiently utilized. The proposed solution may require certain changes in the IEEE 802.16e and the IEEE 802.16m wireless standards, and may be incorporated as a mandatory feature in these particular standards.

Figure 6A:
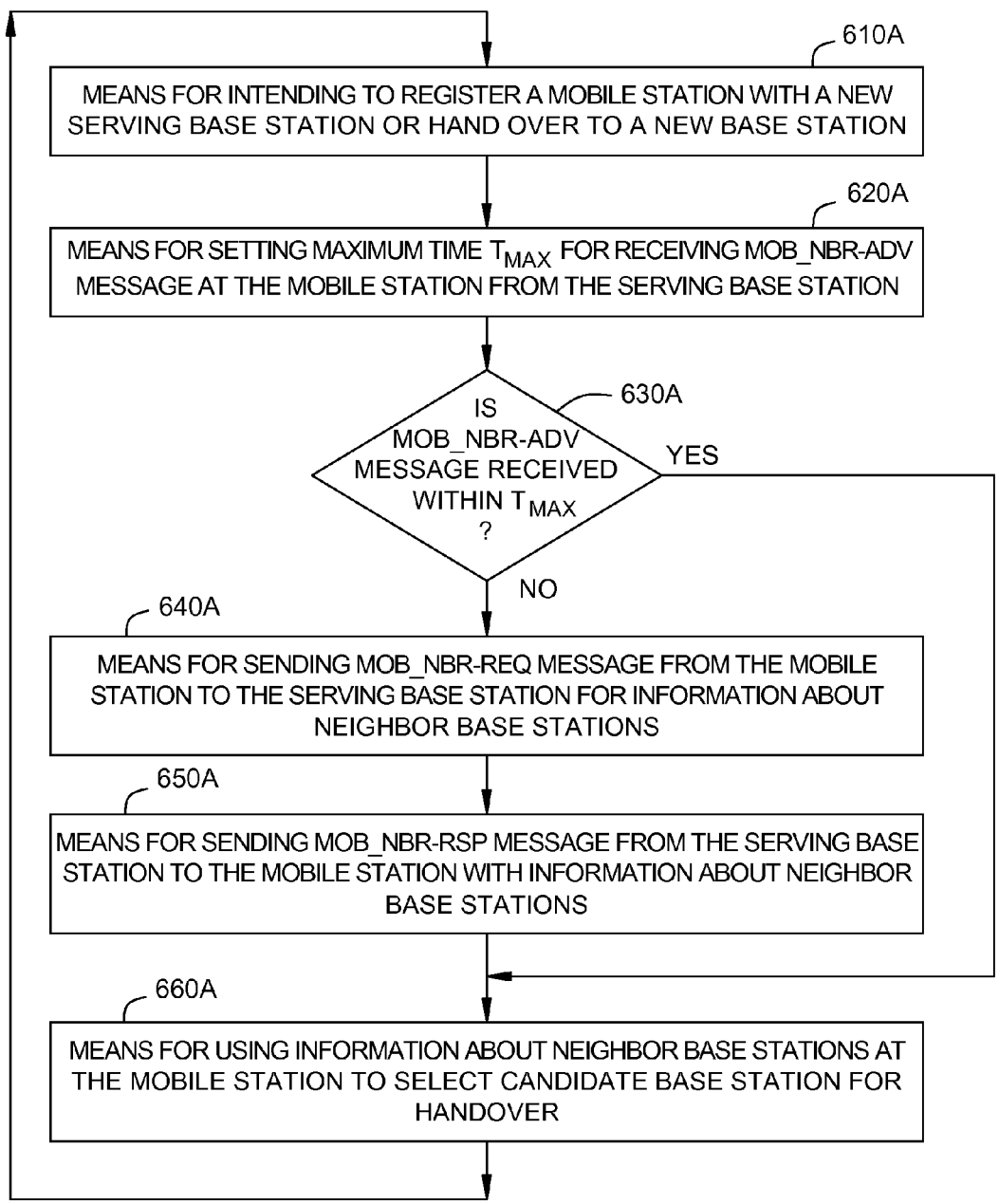
FIG. 6A illustrates example components capable of performing the operations illustrated in FIG. 6.
Figure 8A:
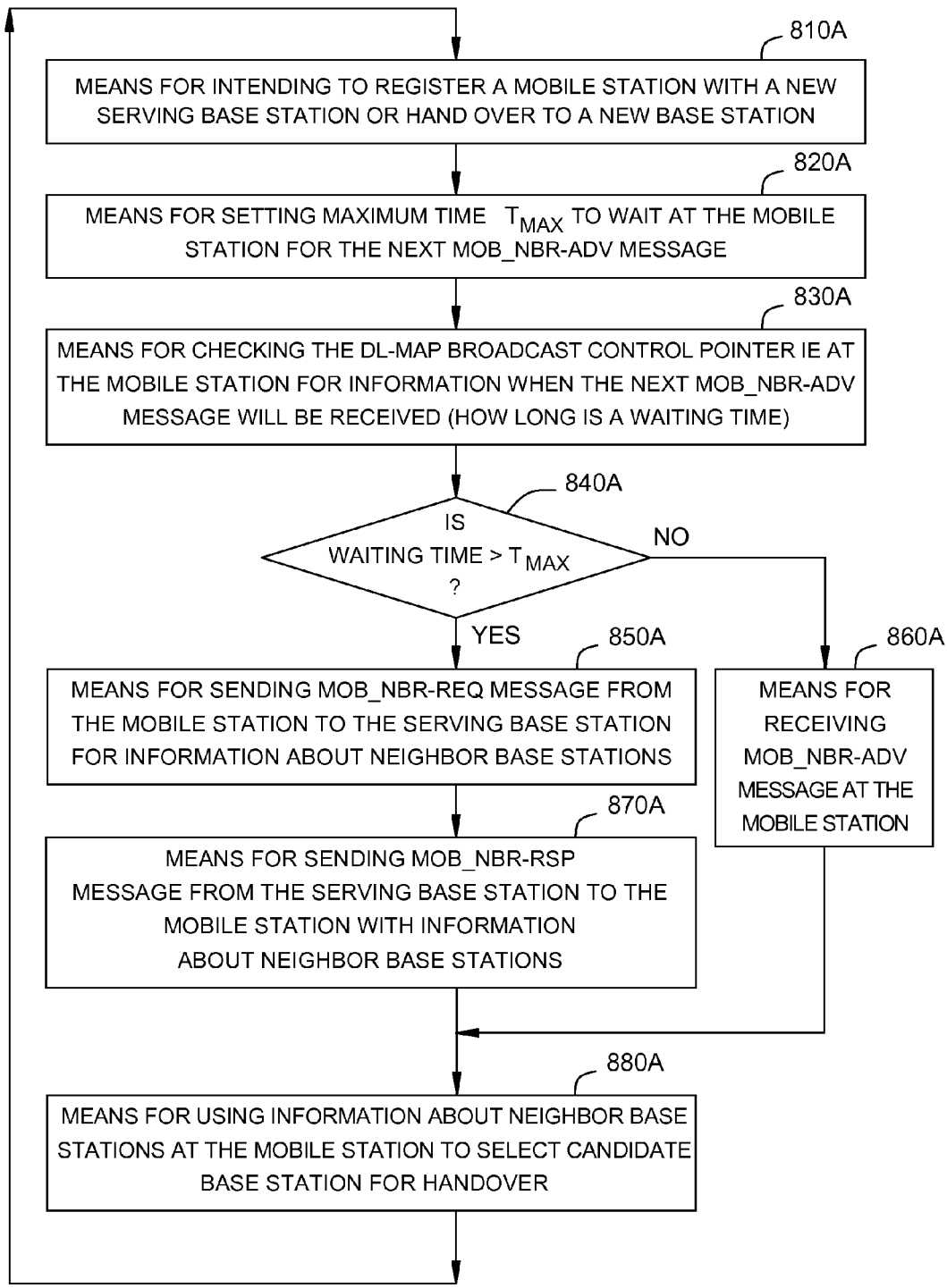
FIG. 8A illustrates example components capable of performing the operations illustrated in FIG. 8.

The various operations of methods described above may be performed by various hardware and/or software component(s) and/or module(s) corresponding to means-plus-function blocks illustrated in the Figures. For example, blocks 610-660 illustrated in FIG. 6 correspond to means-plus-function blocks 610A-660A illustrated in FIG. 6A. Similarly, blocks 810-880 illustrated in FIG. 8 correspond to means-plus-function blocks 810A-880A illustrated in FIG. 8A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for requesting information about available neighbor base stations for a handover in a wireless communications system comprising:

monitoring for mobile neighbor advertisement messages from a serving base station (BS) containing information about neighbor BSs available for handover;

determining an intent to perform a handover from the serving BS to a new serving BS;

associating, with the intended handover, a time period for reception of a next mobile neighbor advertisement message from the serving BS;

determining, based on information regarding when the mobile neighbor advertisement messages can be expected from the serving BS, a time duration until the next mobile neighbor advertisement message from the serving BS; and sending a mobile neighbor request message to the serving BS requesting information about neighbor BSs available for the intended handover if the next neighbor advertisement message will not be received within the time period associated with the intended handover.

2. The method of claim 1, further comprising:

receiving, in response to the mobile neighbor request message, a mobile neighbor response message from the serving BS with information about neighbor BSs available for the intended handover.

3. The method of claim 1, wherein:

the information regarding when the next mobile neighbor advertisement message can be expected is received from the serving BS in an information element (IE) of a DL-MAP.

4. The method of claim 1, wherein:

the information regarding when the next mobile neighbor advertisement message can be expected comprises a number of frames in which the next mobile neighbor advertisement message can be expected.

5. A method for providing information about available neighbor base stations (BSs) for a handover in a wireless communications system comprising:

receiving, from a mobile station (MS), a mobile neighbor request message requesting information about neighbor BSs available for an intended handover, wherein the MS sends the mobile neighbor request message if a next neighbor advertisement message will not be received at the MS within a time period associated with the intended handover, wherein the time period associated with the intended handover is a time period for reception of a next mobile neighbor advertisement message from the serving BS; and in response to the mobile neighbor request message, sending the MS a mobile neighbor response message with information about neighbor BSs available for the intended handover.

6. The method of claim 5, wherein:
the information regarding when the next mobile neighbor advertisement message can be expected is sent from the serving BS in an information element (IE) of a DL-MAP.

7. The method of claim 5, wherein:
the information regarding when the next mobile neighbor advertisement message can be expected comprises a number of frames in which the next mobile neighbor advertisement message can be expected.

8. An apparatus for requesting information about available neighbor base stations for a handover in a wireless communications system comprising:
logic for monitoring for mobile neighbor advertisement messages from a serving base station (BS) containing information about neighbor BSs available for handover;
logic for determining an intent to perform a handover from the serving BS to a new serving BS;
logic for associating, with the intended handover, a time period for reception of a next mobile neighbor advertisement message from the serving BS;
logic for determining, based on information regarding when the mobile neighbor advertisement messages can be expected from the serving BS, a time duration until the next mobile neighbor advertisement message from the serving BS; and
logic for sending a mobile neighbor request message to the serving BS requesting information about neighbor BSs available for the intended handover if the next neighbor advertisement message will not be received within the time period associated with the intended handover.

9. The apparatus of claim 8, further comprising:
logic for receiving, in response to the mobile neighbor request message, a mobile neighbor response message from the serving BS with information about neighbor BSs available for the intended handover.

10. The apparatus of claim 8, wherein:
the information regarding when the next mobile neighbor advertisement message can be expected is received from the serving BS in an information element (IE) of a DL-MAP.

11. The apparatus of claim 8, wherein:
the information regarding when the next mobile neighbor advertisement message can be expected comprises a number of frames in which the next mobile neighbor advertisement message can be expected.

12. An apparatus for providing information about available neighbor base stations (BSs) for a handover in a wireless communications system comprising:
logic for receiving, from a mobile station (MS), a mobile neighbor request message requesting information about neighbor BSs available for an intended handover, wherein the MS sends the mobile neighbor request message if a next neighbor advertisement message will not be received at the MS within a time period associated with the intended handover, wherein the time period associated with the intended handover is a time period for reception of a next mobile neighbor advertisement message from the serving BS; and
in response to the mobile neighbor request message, logic for sending the MS a mobile neighbor response message with information about neighbor BSs available for the intended handover.

13. The apparatus of claim 12, wherein:
the information regarding when the next mobile neighbor advertisement message can be expected is sent from the serving BS in an information element (IE) of a DL-MAP.

14. The apparatus of claim 12, wherein:
the information regarding when the next mobile neighbor advertisement message can be expected comprises a number of frames in which the next mobile neighbor advertisement message can be expected.

15. An apparatus for requesting information about available neighbor base stations for a handover in a wireless communications system comprising:
means for monitoring for mobile neighbor advertisement messages from a serving base station (BS) containing information about neighbor BSs available for handover;
means for determining an intent to perform a handover from the serving BS to a new serving BS;
means for associating, with the intended handover, a time period for reception of a next mobile neighbor advertisement message from the serving BS;
means for determining, based on information regarding when the mobile neighbor advertisement messages can be expected from the serving BS, a time duration until the next mobile neighbor advertisement message from the serving BS; and
means for sending a mobile neighbor request message to the serving BS requesting information about neighbor BSs available for the intended handover if the next neighbor advertisement message will not be received within the time period associated with the intended handover.

16. The apparatus of claim 15, further comprising:
means for receiving, in response to the mobile neighbor request message, a mobile neighbor response message from the serving BS with information about neighbor BSs available for the intended handover.

17. The apparatus of claim 15, wherein:
the information regarding when the next mobile neighbor advertisement message can be expected is received from the serving BS in an information element (IE) of a DL-MAP.

18. The apparatus of claim 15, wherein:
the information regarding when the next mobile neighbor advertisement message can be expected comprises a number of frames in which the next mobile neighbor advertisement message can be expected.

19. An apparatus for providing information about available neighbor base stations (BSs) for a handover in a wireless communications system comprising:
means for receiving, from a mobile station (MS), a mobile neighbor request message requesting information about neighbor BSs available for an intended handover, wherein the MS sends the mobile neighbor request message if a next neighbor advertisement message will not be received at the MS within a time period associated with the intended handover, wherein the time period associated with the intended handover is a time period for reception of a next mobile neighbor advertisement message from the serving BS; and
in response to the mobile neighbor request message, means for sending the MS a mobile neighbor response message with information about neighbor BSs available for the intended handover.

20. The apparatus of claim 19, wherein:
the information regarding when the next mobile neighbor advertisement message can be expected is sent from the serving BS in an information element (IE) of a DL-MAP.

21. The apparatus of claim 19, wherein:
the information regarding when the next mobile neighbor advertisement message can be expected comprises a number of frames in which the next mobile neighbor advertisement message can be expected.

22. A computer-program product for requesting information about available neighbor base stations for a handover in a wireless communications system, comprising a non-transitory computer readable medium having instructions stored thereon, the instructions being executable by one or more processors and the instructions comprising:
   instructions for monitoring for mobile neighbor advertisement messages from a serving base station (BS) containing information about neighbor BSs available for the handover;
   instructions for determining an intent to perform a handover from the serving BS to a new serving BS;
   instructions for associating, with the intended handover, a time period for reception of a next mobile neighbor advertisement message from the serving BS;
   instructions for determining, based on information regarding when the mobile neighbor advertisement messages can be expected from the serving BS, a time duration until the next mobile neighbor advertisement message from the serving BS; and
   instructions for sending a mobile neighbor request message to the serving BS requesting information about neighbor BSs available for the intended handover if the next neighbor advertisement message will not be received within the time period associated with the intended handover.

23. The computer-program product of claim 22, wherein the instructions further comprise:
   instructions for receiving, in response to the mobile neighbor request message, a mobile neighbor response message from the serving BS with information about neighbor BSs available for the intended handover.

24. The computer-program product of claim 22, wherein:
the information regarding when the next mobile neighbor advertisement message can be expected is received from the serving BS in an information element (IE) of a DL-MAP.

25. The computer-program product of claim 22, wherein:
the information regarding when the next mobile neighbor advertisement message can be expected comprises a number of frames in which the next mobile neighbor advertisement message can be expected.

26. A computer-program product for providing information about available neighbor base stations (BSs) for a handover in a wireless communications system, comprising a non-transitory computer readable medium having instructions stored thereon, the instructions being executable by one or more processors and the instructions comprising:
   instructions for receiving, from a mobile station (MS), a mobile neighbor request message requesting information about neighbor BSs available for an intended handover, wherein the MS sends the mobile neighbor request message if a next neighbor advertisement message will not be received at the MS within a time period associated with the intended handover, wherein the time period associated with the intended handover is a time period for reception of a next mobile neighbor advertisement message from the serving BS; and
   in response to the mobile neighbor request message, instructions for sending the MS a mobile neighbor response message with information about neighbor BSs available for the handover.

27. The computer-program product of claim 26, wherein:
the information regarding when the mobile neighbor advertisement message can be expected is sent from the serving BS in an information element (IE) of a DL-MAP.

28. The computer-program product of claim 26, wherein:
the information regarding when the next mobile neighbor advertisement message can be expected comprises a number of frames in which the next mobile neighbor advertisement message can be expected.

* * * * *